Jan. 13, 1948.   H. LEHDE   2,434,324
EARTH INDUCTOR COMPASS
Filed Oct. 6, 1944   2 Sheets-Sheet 1

INVENTOR.
HENRY LEHDE
BY
*Edward L. Spueller*
ATTORNEY

Patented Jan. 13, 1948

2,434,324

UNITED STATES PATENT OFFICE 2,434,324

EARTH INDUCTOR COMPASS

Henry Lehde, Brooklyn, N. Y., assignor to Control Instrument Company, Inc., Brooklyn, N. Y., a corporation of New York Application October 6, 1944, Serial No. 557,532

1 Claim. (Cl. 33—204)

The present invention relates to improvements in earth inductor compasses, and in particular to a type employing a moving conductor to detect the direction of the earth's magnetic field by electromagnetic induction. In its general organization the invention resides in the maintenance of a moving conductor in such a position that the earth's magnetic field does not cause any induced voltage to be produced in said conductor.

An object of the invention is to provide an improved compass employing a moving coil structure of simple, compact and inexpensive construction.

Another object is to employ a sensitive element which requires a very small amount of power for its operation, and which cannot be damaged by the temporary application of a strong magnetic field.

Another object is to eliminate the necessity for sliding electrical contact with a high speed movable element.

Another object is to employ an electrical system which is readily adaptable to the employment of simple detecting or follow up means for the operation of auxiliary equipment.

Another object is to provide a movable element, which, because of its compactness, is readily adaptable for mounting on a small vertical gyro, to prevent errors due to tilting of the element from the horizontal.

Still another object is to provide a movable coil arrangement which will not have voltage induced in it by stray A. C. fields.

Other objects and advantages will appear during the course of the description.

Figure 1:
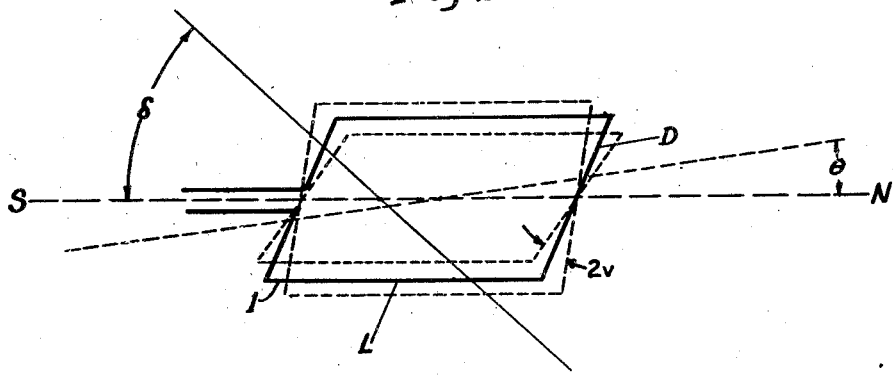
Fig. 1 is a diagrammatic view illustrating the principles involved in mounting a vibrating conductor respective to the earth's magnetic field so that it may be employed as a means of determining the direction of the field.

In Fig. 1, the rectangular loop of wire 1 of a length L and width D is maintained in a horizontal position and is vibrated at a frequency $f$ about a small angle of $\pm v$ about the horizontal. If the axis of vibration is in a north-south line N-S, no voltage will be induced in the loop by the vertical movement of the sides of the loop in the earth's field. If the axis of vibration is at an angle $\theta$ with the north-south line, the sides of the loop will cut the earth's field and will produce an alternating voltage of the frequency $f$. Assuming that the strength of the earth's field is H, that its angle of inclination to the horizontal is $\delta$, and the angle of maximum vibration is $v$, the A. C. voltage induced in the coil will be proportional to the product $fHLD \cos \delta \sin \theta$.

The polarity of the voltage with respect to the angle of vibration will depend on the sin of the angle $\theta$. This furnishes a means of determining the direction of the deviation of the coil axis from a north-south line. A double frequency voltage is also produced when $\delta$ is not zero and the angle of vibration $v$ is large, but this may be disregarded, since voltage detecting means can be employed which is sensitive only to the frequency $f$.

Figure 2:
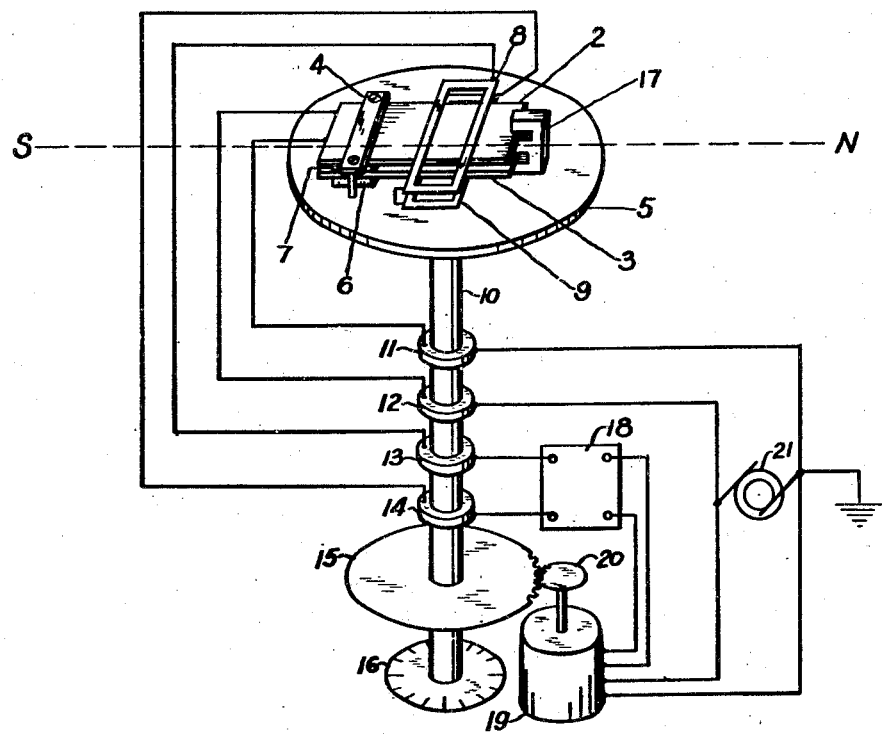
Fig. 2 is a schematic diagram of a compass system employing this principle.

Fig. 2 illustrates a simple and practical method of employing a vibrating coil system to determine the direction of the earth's field. The Rochelle salt crystals 2 and 3 are in the form of rectangular plates, clamped as shown with the spacers 6 and 7 between the strip 4 and the circular plate 5. The internal structure of the crystals is not shown, but as is well known in the art, each consists of two thin plates of crystal cemented together with a foil electrode between them, and a second electrode completely surrounding and protecting both plates. When a voltage is applied to the electrodes, the crystal will twist in a direction dependent on the polarity of the voltage.

The free ends of the crystals 2 and 3 are supported by the notched member 17, attached to the circular mounting plate 5. This permits twisting of the crystals about a horizontal axis, while preventing vertical movement of the unclamped ends due to shock, which might result in breakage. The coils 8 and 9 are attached respectively to crystals 2 and 3, so that they will vibrate with the crystals. The shaft 10 is fastened to the center of the mounting plate 5. On the shaft 10 are mounted the slip rings 11, 12, 13 and 14, the gear 15 and the dial 16. Coils 8 and 9 are connected in series with each other and leads are brought out to the slip rings 13 and 14. The brushes in contact with slip rings 13 and 14 are connected to the input of an amplifier conventionally shown at 18. The output of the amplifier goes to one phase of a two phase follow-up motor 19, which drives the gear 15 by means of pinion 20. The other phase of the follow-up motor is energized by the alternator 21.

Leads from the alternator 21 go to the brushes 11 and 12, which are connected to the electrodes of the crystals 2 and 3. The crystals are connected so that they vibrate in opposite directions, and therefore any torsional reaction on the supporting plate 5 will be eliminated. Coils 8 and 9 are connected in series so that their induced voltages will add when they vibrate in opposite directions. If coils 8 and 9 pick up voltages from a stray A. C. magnetic field, this series connection will cause these voltages to oppose and cancel each other. Electrostatic pickup of voltage from the crystal electrodes to the coils attached to the crystals is prevented by connecting the outer electrodes of the two crystals to ground. This connection is shown at the alternator 21.

Assuming that the axis of crystal vibration is at an angle $\theta$ with the N-S line, a voltage of the frequency of the crystal vibration will be generated in the coils 8 and 9. The polarity of this voltage will depend on the sin of the angle $\theta$. After amplification, this voltage is applied to one phase of the motor 19, which will run in a direction determined by the sin of the angle $\theta$. Connections are made so that the motor will run to reduce the value of the angle $\theta$, and will cause the axis of crystal vibration to assume a N-S direction. This will be indicated by the dial 16.

If an inductor compass is tilted from the horizontal by an angle of pitch $p$ in a vertical north-south plane and an angle of roll $r$ in a vertical east-west plane, this will cause an error in the indicated N-S direction. This error is given by the formula $$\sin E = \tan (\delta - p) \sin r$$

where E is the error in degrees and $\delta$ is the magnetic declination. It is evident that large errors are produced when the declination $\delta$ is large, and that an inductor compass must be stabilized if it is to produce accurate indications.

Figure 3:
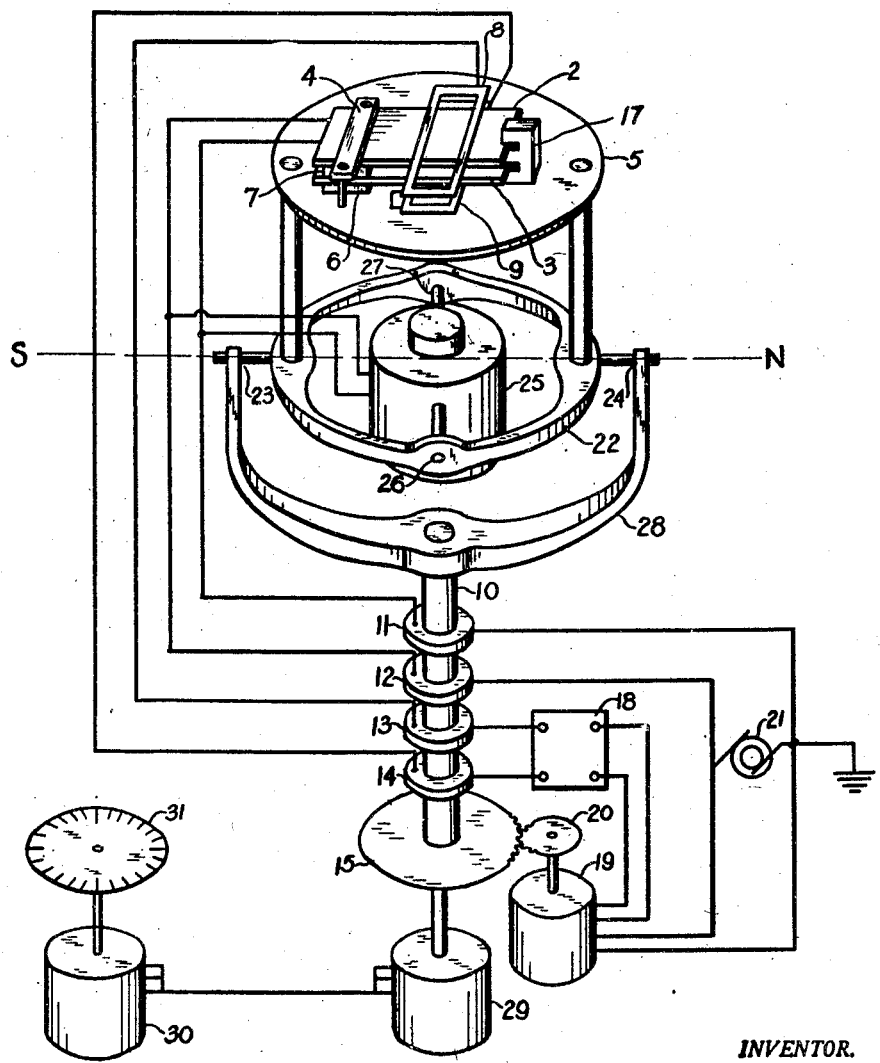
Fig. 3 is a diagrammatic view illustrating the method of mounting the compass element on a vertical gyro for stabilization, and the transmission of the compass indication to remote points.

From the formula, it appears that it is necessary to stabilize against roll only. Accordingly, in Fig. 3, the mounting plate 5 is supported above the gimbal ring 22, which is free to rotate in the bearings 23 and 24. The vertical gyro 25 is supported in the gimbal ring 22 by the bearings 26 and 27, and serves to stabilize the plate 5 against roll. The gimbal ring 22 is supported by the yoke 28, which is attached to the vertical shaft 10. As in Fig. 2, the slip rings 11, 12, 13 and 14 are located on the shaft 10, and are employed to make connections to the compass element on the mounting plate 5. The gyro 25 is of the self-erecting type, preferably motor driven from the alternator 21 by connections to slip rings 11 and 12. The crystals 2 and 3 are connected in parallel with the gyro motor. The attached coils 8 and 9 are connected in series with each other and leads are brought to the slip rings 13 and 14.

Electrical connections from the gyro 25 and the compass element on plate 5 may be brought to the slip rings 11, 12, 13 and 14 by the usual means of employing spiral connectors at the bearings 23, 24, 26 and 27. These are not shown for the sake of clearness.

The operation of the compass element, alternator 21, amplifier 18 and follow-up motor 19 is exactly as described with reference to Fig. 2. The synchro transmission unit 29 is attached to the lower end of shaft 10. It is arranged to drive a synchro receiver unit 30, with an attached dial 31, which will indicate the compass heading.

From the above description, it will be evident that this arrangement of a gyro-stabilized compass system furnishes a means of locating the compass element at a point remote from the indicating dial 31. This permits the selection of a location for the compass element which is comparatively free from the magnetic influences exerted by the structure of the ship or aircraft on which it is located. The attachment of the plate 5 and compass element to the gimbal ring 22 simplifies the problem of bringing the leads from the compass element to the slip rings, as compared to having the compass element attached to the gyro motor frame.

In the event it is desired to maintain any navigable craft, such as a ship or airplane, on a fixed course, the rudder of the craft, with suitable damping mechanisms, may be controlled by the follow-up motor 19. The axis of vibration of the crystals is set at the desired angle with reference to the fore-aft line of the craft, which will then be maintained at that angle with reference to the earth's field.

The arrangement of a compass element employing a vibrating conductor is capable of a large number of modifications. The coils 8 and 9 may be mounted for oscillation about a vertical, instead of a horizontal, axis. They may be vibrated by any other suitable means, but the crystal arrangement shown is considered preferable because of its compactness, low power consumption, and high electrical to mechanical efficiency.

The principle of employing two parallel coils to eliminate the effect of stray A. C. fields, as described, is also operative when only one of the coils is vibrated.

The scope of the invention is therefore not to be limited except as indicated by the following claim.

What is claimed is:

In an inductor compass, a rotatable member, a pair of spaced vibratory crystals, means to clamp adjacent ends of said crystals in spaced relation to each other and to said rotatable member, a support on said rotatable member having means to receive the free opposite ends of said crystals so as to restrain the same against movement in one direction, a pair of series connected coils each attached to one of said crystals, a grounded source of alternating current, connections from said source to said crystals to torsionally vibrate the latter in opposite directions and generate in said coils a voltage of the frequency of said crystal vibration while preventing electrostatic pickup of voltage by said coils, and means responsive to said voltage for turning said rotatable member to thereby orient the torsional vibration of said crystals with respect to the earth's magnetic field.

HENRY LEHDE.

REFERENCES CITED

The following references are of record in the file of this patent:

UNITED STATES PATENTS

| Number | Name | Date |
|---|---|---|
| 1,737,019 | Nicolson | Nov. 26, 1929 |
| 2,331,617 | Moore | Oct. 12, 1943 |
| 2,376,883 | Riggs et al. | May 29, 1945 |

FOREIGN PATENTS

| Number | Country | Date |
|---|---|---|
| 314,786 | Great Britain | 1929 |